UNITED STATES PATENT OFFICE.

GUSTAV WILHELM ALBRECHT STEIN, OF WETZLAR, GERMANY.

HYDRAULIC CEMENT.

SPECIFICATION forming part of Letters Patent No. 562,982, dated June 30, 1896.

Application filed September 3, 1895. Serial No. 561,322. (No specimens.) Patented in Germany July 31, 1893, No. 82,210; in Luxemburg January 8, 1894, No. 1,952; in England January 9, 1894, No. 475; in Belgium January 10, 1894, No. 108,027; in Sweden January 11, 1894, No. 5,348; in Spain February 16, 1894, No. 15,368; in Austria-Hungary May 20, 1894, No. 768/5,351, and in France January 10, 1895, No. 235,425.

*To all whom it may concern:*

Be it known that I, GUSTAV WILHELM ALBRECHT STEIN, a subject of the Emperor of Germany, residing at Wetzlar, Germany, have invented certain new and useful Improvements in the Manufacture of Cement, (for which I have obtained Letters Patent in Germany, No. 82,210, dated July 31, 1893; in Austria-Hungary, No. 768/5,351, dated May 20, 1894; in Great Britain, No. 475, dated January 9, 1894; in Belgium, No. 108,027, dated January 10, 1894; in France, No. 235,425, dated January 10, 1895; in Sweden, No. 5,348, dated January 11, 1894; in Luxemburg, No. 1,952, dated January 8, 1894, and in Spain, No. 15,368, dated February 16, 1894,) of which the following is a specification.

It is well known that in the manufacture of Portland or hydraulic cement calcareous and argilliferous materials enter into the composition thereof, and that these materials, after being incorporated with each other, are burned in order to assume a cinder-like state. It is then absolutely necessary to disintegrate the mass in order to reduce the same to a powdered condition. In the burning of such materials they become more or less compact and hard, and thus a preliminary disintegration by cumbersome machinery is rendered necessary before the compacted hard mass can be reduced to a powdered state. Such preliminary operations make the process expensive and cause the expenditure of much labor, which it is very desirable should be avoided.

The principal object of my present invention is to provide a cement which is brittle and readily reducible to a finely-divided state or condition without the necessity of preliminary disintegration or crushing.

My invention consists in adding a small quantity of unground slag-sand or granulated furnace-slag to a complete or finished mixture of raw cement, the object of which procedure is not to facilitate chemical combination of such mixture of raw cement, but for the sole purpose of making the sintered mixture brittle, in order that on being cooled the same may crumble into small particles or pieces, and this without the employment of special disintegrating apparatus.

In order that others skilled in the art to which my present invention appertains may readily undertand the same, I will now proceed to describe a mode of carrying the same into effect.

To the finished charge or complete mixture of raw calcareous and argilliferous materials, or an admixture in about equal proportions of each of such materials, is added about five per cent. of unground slag-sand, which is adapted to make the same brittle.

It may be here remarked that the action of the incorporated unground slag-sand is essentially mechanical and not chemical.

According to my invention, when the raw mixture of cement is of too calcareous a nature, a crumbling to powder during the burning or cooling of the burned mass does not occur, but, on the other hand, a falling to pieces, or, more correctly speaking, a springing into small pieces, ranging from the size of a nut to a pea, is occasioned, instead of a solid clinker which can only be pulverized with the application of considerable mechanical power. A brittlely sintered or flaky cement which can be readily reduced is thereby obtained, and, moreover, such cement is thoroughly and properly burned.

In the practice of my invention it has been found that the cement composed of the said materials and unground slag-sand in about the proportion stated will not crumble while in the kiln, but when removed from the kiln and cooled a well-defined sintered or flaky product results, which may thereafter, if desired, be easily reduced to a powder, and supplies a product which in use readily hardens.

For the sake of example it may be mentioned that a cement product composed of one part of cement to three parts of ordinary sand with about ten per cent. of unground slag-sand added thereto has given the following tensile strengths: in seven days about twenty-seven pounds for approximately each three-eighths inch squared; in twenty-five days about 40.5 pounds for approximately three-eighths inch squared; in three months about fifty-eight pounds for approximately three-eighths inch squared; in one year about sixty-six pounds for approximately three-eighths inch squared.

As regards constancy of volume this cement has not only stood tests prescribed by the standards, but has proved to be good in every other respect, after severe tests of burning and boiling.

A cement which hardens to the extent shown and with such a constancy of volume removes all doubt as to its quality.

I am aware that it has been proposed to employ furnace-slag in cement, in which the slag performs an essential component of the mixture of raw chalk and clay, as set forth in the British Letters Patent No. 1,510 of 1879. In the British patent it is stated that there are employed, as the ingredients of which the cement is composed, the residual products or slag obtained from blast-furnaces, to which are added raw chalk and clay. The slag is procured either in the condition of powder from blast-furnaces, the residual products of which naturally assume a powdered or granular form, or the slag is obtained from other blast-furnaces and reduced to a fine state or division by mechanical or other well-known means. With the slag, when in this condition, are mixed the raw chalk and clay, and the whole mixture is thereafter subjected to washing, drying, calcining, and grinding by any ordinary or suitable processes. Such is not my invention and I make no claim to the making of such a cement; but, Having now particularly described the nature and objects of my invention, what I claim as new, and desire to secure by Letters Patent, is—

The herein-described method of making hydraulic cement, which consists in first making a mechanical mixture of raw calcareous and argilliferous materials in proportions proper for making cement as specified, then combining mechanically with said mixture from five per cent. to ten per cent. of granulated unpulverized slag-sand, then burning the combined substances until the same form a brittle cinder-like mass and cooling the mass until it crumbles into flakes, and then comminuting the same, substantially as and for the purposes described.

In witness whereof I have hereunto signed my name in the presence of two subscribing witnesses.

GUSTAV WILHELM ALBRECHT STEIN.

Witnesses:
ALVESTO S. HOGUE,
JEAN GRUND.